United States Patent
Scapa

(10) Patent No.: US 9,633,182 B2
(45) Date of Patent: Apr. 25, 2017

(54) TOKEN BASED DIGITAL CONTENT LICENSING METHOD

(71) Applicant: Altair Engineering, Inc., Troy, MI (US)

(72) Inventor: James Scapa, West Bloomfield, MI (US)

(73) Assignee: Altair Engineering, Inc., Troy, MI (US)

( * ) Notice: Subject to any disclaimer, the term of this patent is extended or adjusted under 35 U.S.C. 154(b) by 43 days.

(21) Appl. No.: 14/862,208

(22) Filed: Sep. 23, 2015

(65) Prior Publication Data
US 2016/0012211 A1 Jan. 14, 2016

Related U.S. Application Data

(63) Continuation-in-part of application No. 14/531,443, filed on Nov. 3, 2014, which is a continuation-in-part
(Continued)

(51) Int. Cl.
*G06F 21/10* (2013.01)
*G06Q 30/06* (2012.01)
*G06Q 50/18* (2012.01)

(52) U.S. Cl.
CPC ............ *G06F 21/105* (2013.01); *G06F 21/10* (2013.01); *G06Q 30/06* (2013.01); *G06Q 50/184* (2013.01)

(58) Field of Classification Search
CPC ... G06F 21/10; G06F 21/105; H04L 2463/101
See application file for complete search history.

(56) References Cited

U.S. PATENT DOCUMENTS 4,937,863 A 6/1990 Robert et al.
5,204,897 A 4/1993 Wyman
(Continued)

FOREIGN PATENT DOCUMENTS

CN 102356397 A 2/2012
EP 1862202 A2 12/2007
(Continued)

OTHER PUBLICATIONS

Altair Releases HyperWorks 9.0, Connecting Engineerings with New Solver Technology and to the Global Grid: Newest version of Altair's simulation platform delivers on-demand access to the ISV applications and offers multi-core licensing business model Anonymous. PR Newswire [New York] May 19, 2008, downloaded from ProQuestDirect on the Internet 06, 3 pages.
(Continued)

*Primary Examiner* — James Turchen
(74) *Attorney, Agent, or Firm* — Young Basile Hanlon & MacFarlane, P.C.

(57) ABSTRACT

A method and apparatus for weighted leveling license unit based digital content access control are disclosed. Weighted leveling license unit based digital content access control may include enabling access to a first digital content object by a first user device associated with a first unique user identifier, receiving a request for access to a second digital content object, wherein the request indicates the first unique user identifier, identifying a weighted leveling licensing weight, and, on a condition that a product of the weighted leveling licensing weight and a sum of an assigned unit count for the first digital content object and an assigned unit count for the second digital content object is within a cardinality of a plurality of available license units, enabling access to the second digital content object by the first user device.

10 Claims, 7 Drawing Sheets

Related U.S. Application Data of application No. 12/753,228, filed on Apr. 2, 2010, now abandoned, which is a continuation-in-part of application No. 11/061,166, filed on Feb. 21, 2005, now Pat. No. 8,073,780, which is a continuation-in-part of application No. 09/855,317, filed on May 15, 2001, now Pat. No. 7,672,972.

(60) Provisional application No. 61/166,036, filed on Apr. 2, 2009.

(56) References Cited

U.S. PATENT DOCUMENTS

| | | | |
|---|---|---|---|
| 5,260,999 A | 11/1993 | Wyman | |
| 5,390,297 A * | 2/1995 | Barber | G06F 21/105 705/59 |
| 5,438,508 A * | 8/1995 | Wyman | G06F 21/105 705/1.1 |
| 5,579,222 A | 11/1996 | Bains et al. | |
| 5,606,493 A | 2/1997 | Duscher et al. | |
| 5,634,080 A | 5/1997 | Kikinis et al. | |
| 5,671,412 A * | 9/1997 | Christiano | G06Q 30/04 |
| 5,742,813 A | 4/1998 | Kavanagh et al. | |
| 5,745,879 A | 4/1998 | Wyman | |
| 5,752,041 A | 5/1998 | Fosdick | |
| 5,758,069 A | 5/1998 | Olsen | |
| 5,758,257 A | 5/1998 | Herz et al. | |
| 5,790,664 A * | 8/1998 | Coley | G06F 21/10 709/203 |
| 5,835,910 A | 11/1998 | Kavanagh et al. | |
| 5,905,860 A | 5/1999 | Olsen et al. | |
| 5,931,901 A | 8/1999 | Wolfe et al. | |
| 5,966,444 A | 10/1999 | Yuan et al. | |
| 5,973,683 A | 10/1999 | Cragun et al. | |
| 5,990,883 A | 11/1999 | Byrne et al. | |
| 6,009,401 A | 12/1999 | Horstmann | |
| 6,020,883 A | 2/2000 | Herz et al. | |
| 6,026,387 A | 2/2000 | Kesel | |
| 6,029,176 A | 2/2000 | Cannon | |
| 6,038,591 A | 3/2000 | Wolfe et al. | |
| 6,049,332 A | 4/2000 | Boetje et al. | |
| 6,049,789 A | 4/2000 | Frison et al. | |
| 6,088,722 A | 7/2000 | Herz et al. | |
| 6,101,606 A * | 8/2000 | Diersch | G06F 21/105 380/201 |
| 6,118,492 A | 9/2000 | Milnes et al. | |
| 6,133,909 A | 10/2000 | Schein et al. | |
| 6,141,754 A | 10/2000 | Choy | |
| 6,160,570 A | 12/2000 | Sitnik | |
| 6,161,137 A | 12/2000 | Ogdon et al. | |
| 6,161,142 A | 12/2000 | Wolfe et al. | |
| 6,169,992 B1 | 1/2001 | Beall et al. | |
| 6,173,269 B1 | 1/2001 | Solokl et al. | |
| 6,182,050 B1 | 1/2001 | Ballard | |
| 6,198,906 B1 | 3/2001 | Boetje et al. | |
| 6,219,652 B1 | 4/2001 | Carter et al. | |
| 6,240,415 B1 | 5/2001 | Blumberg | |
| 6,256,664 B1 | 7/2001 | Donoho et al. | |
| 6,262,721 B1 | 7/2001 | Tsukidate et al. | |
| 6,263,362 B1 | 7/2001 | Donoho et al. | |
| 6,263,501 B1 | 7/2001 | Schein et al. | |
| 6,275,844 B1 | 8/2001 | Rail | |
| 6,286,140 B1 | 9/2001 | Ivanyi | |
| 6,317,881 B1 | 11/2001 | Shah-Nazaroff et al. | |
| 6,324,519 B1 | 11/2001 | Eldering | |
| 6,411,941 B1 | 6/2002 | Mullor et al. | |
| 6,473,794 B1 | 10/2002 | Guheen et al. | |
| 6,502,079 B1 * | 12/2002 | Ball | G06Q 30/02 705/400 |
| 6,502,124 B1 | 12/2002 | Shimakawa et al. | |
| 6,519,571 B1 | 2/2003 | Guheen et al. | |
| 6,536,037 B1 | 3/2003 | Barrese et al. | |
| 6,574,612 B1 * | 6/2003 | Baratti | G06F 21/105 705/59 |
| 6,591,244 B2 | 7/2003 | Jim et al. | |
| 6,606,744 B1 | 8/2003 | Mikurak | |
| 6,615,166 B1 | 9/2003 | Guheen et al. | |
| 6,631,359 B1 * | 10/2003 | Braitberg | G06Q 30/0283 705/400 |
| 6,671,818 B1 | 12/2003 | Mikurak | |
| 6,721,713 B1 | 4/2004 | Guheen et al. | |
| 6,728,766 B2 | 4/2004 | Cox et al. | |
| 6,732,106 B2 | 5/2004 | Okamoto et al. | |
| 6,816,882 B1 | 11/2004 | Conner et al. | |
| 6,859,792 B1 * | 2/2005 | Marjadi | G06F 21/10 705/51 |
| 6,889,206 B1 | 5/2005 | Nuttall | |
| 6,920,567 B1 * | 7/2005 | Doherty | G06F 21/10 707/999.104 |
| 6,925,497 B1 * | 8/2005 | Vetrivelkumaran | G06Q 10/0875 709/216 |
| 6,957,186 B1 | 10/2005 | Guheen et al. | |
| 6,966,832 B2 | 11/2005 | Leen et al. | |
| 7,013,294 B1 | 3/2006 | Sekigawa et al. | |
| 7,035,918 B1 * | 4/2006 | Redding | G06F 21/105 370/352 |
| 7,036,091 B1 | 4/2006 | Nguyen | |
| 7,124,101 B1 | 10/2006 | Mikurak | |
| 7,130,807 B1 | 10/2006 | Mikurak | |
| 7,139,737 B2 | 11/2006 | Takahashi et al. | |
| 7,165,041 B1 | 1/2007 | Guheen et al. | |
| 7,193,995 B1 * | 3/2007 | Solala | H04L 63/0281 370/389 |
| 7,194,439 B2 | 3/2007 | Kassan et al. | |
| 7,200,632 B1 * | 4/2007 | Greschler | H04L 67/34 709/203 |
| 7,203,966 B2 | 4/2007 | Abburi et al. | |
| 7,209,900 B2 | 4/2007 | Hunter et al. | |
| 7,281,267 B2 * | 10/2007 | Tarbotton | G06F 21/105 380/229 |
| 7,299,209 B2 | 11/2007 | Collier | |
| 7,313,512 B1 | 12/2007 | Traut et al. | |
| 7,315,826 B1 | 1/2008 | Guheen et al. | |
| 7,328,263 B1 * | 2/2008 | Sadjadi | G06F 9/526 707/999.008 |
| 7,395,245 B2 | 7/2008 | Okamoto et al. | |
| 7,555,460 B1 * | 6/2009 | Barkan | G06Q 20/06 235/492 |
| 7,590,601 B2 | 9/2009 | Shea et al. | |
| 7,672,972 B1 | 3/2010 | Marjadi et al. | |
| 7,716,077 B1 | 5/2010 | Mikurak | |
| 7,716,348 B1 * | 5/2010 | Redding | G06F 21/10 705/59 |
| 7,818,350 B2 | 10/2010 | New et al. | |
| 8,032,409 B1 | 10/2011 | Mikurak | |
| 8,121,874 B1 * | 2/2012 | Guheen | G06Q 10/063 705/28 |
| 8,392,505 B2 | 3/2013 | Haughay, Jr. et al. | |
| 8,504,932 B2 | 8/2013 | Quek et al. | |
| 2001/0010046 A1 * | 7/2001 | Muyres | G06F 21/10 705/52 |
| 2001/0011253 A1 * | 8/2001 | Coley | G06F 21/10 705/59 |
| 2001/0013024 A1 | 8/2001 | Takahashi et al. | |
| 2001/0037404 A1 * | 11/2001 | Hafsteinsson | G06F 17/30905 709/246 |
| 2002/0007298 A1 | 1/2002 | Jim et al. | |
| 2002/0029347 A1 * | 3/2002 | Edelman | G06F 21/10 713/193 |
| 2002/0049679 A1 * | 4/2002 | Russell | G06F 21/10 705/52 |
| 2002/0059094 A1 | 5/2002 | Hosea et al. | |
| 2002/0069263 A1 | 6/2002 | Sears et al. | |
| 2002/0091568 A1 | 7/2002 | Kraft et al. | |
| 2002/0129356 A1 | 9/2002 | Hellerstein et al. | |
| 2002/0156824 A1 * | 10/2002 | Armstrong | G06F 9/5077 718/104 |
| 2002/0161908 A1 * | 10/2002 | Benitez | G06F 8/65 709/231 |
| 2002/0183045 A1 | 12/2002 | Emmerson et al. | |

(56) References Cited

U.S. PATENT DOCUMENTS

| | | | |
|---|---|---|---|
| 2002/0194008 A1* | 12/2002 | Yang | G06Q 50/184 705/310 |
| 2002/0194589 A1 | 12/2002 | Cristofalo et al. | |
| 2003/0036683 A1 | 2/2003 | Kehr et al. | |
| 2003/0059022 A1 | 3/2003 | Nebiker et al. | |
| 2003/0069766 A1 | 4/2003 | Hoffman et al. | |
| 2003/0084165 A1 | 5/2003 | Kjellberg et al. | |
| 2003/0105718 A1* | 6/2003 | Hurtado | G06F 21/10 705/51 |
| 2003/0135380 A1 | 7/2003 | Lehr et al. | |
| 2003/0135474 A1 | 7/2003 | Circenis et al. | |
| 2003/0182142 A1 | 9/2003 | Valenzuela et al. | |
| 2003/0208763 A1 | 11/2003 | McElhatten et al. | |
| 2004/0122774 A1 | 6/2004 | Studd et al. | |
| 2005/0049931 A1 | 3/2005 | Wisnudel et al. | |
| 2005/0182731 A1 | 8/2005 | Marjadi et al. | |
| 2006/0004668 A1 | 1/2006 | Hamnen et al. | |
| 2006/0020556 A1 | 1/2006 | Hamnen | |
| 2006/0073820 A1 | 4/2006 | Craswell et al. | |
| 2006/0106728 A1 | 5/2006 | Yellai et al. | |
| 2006/0248017 A1 | 11/2006 | Koka et al. | |
| 2006/0287959 A1 | 12/2006 | Blecken | |
| 2006/0294019 A1 | 12/2006 | Dayan et al. | |
| 2007/0106622 A1 | 5/2007 | Boomershine et al. | |
| 2007/0219923 A1 | 9/2007 | Shea et al. | |
| 2007/0226150 A1 | 9/2007 | Pietrzak et al. | |
| 2007/0226155 A1 | 9/2007 | Yu et al. | |
| 2007/0233578 A1 | 10/2007 | Fusz et al. | |
| 2007/0233837 A1 | 10/2007 | Imai | |
| 2007/0244826 A1 | 10/2007 | Wang | |
| 2007/0277233 A1 | 11/2007 | Bodin et al. | |
| 2007/0299845 A1 | 12/2007 | Tokunaga | |
| 2008/0005032 A1 | 1/2008 | Znidarsic | |
| 2008/0064493 A1 | 3/2008 | Andersson | |
| 2008/0071689 A1 | 3/2008 | Tabet | |
| 2008/0080552 A1 | 4/2008 | Gates et al. | |
| 2008/0082450 A1 | 4/2008 | Grimm et al. | |
| 2008/0083025 A1 | 4/2008 | Meijer et al. | |
| 2008/0154798 A1 | 6/2008 | Valz | |
| 2008/0178284 A1 | 7/2008 | Harwell | |
| 2008/0228533 A1 | 9/2008 | McGuire et al. | |
| 2008/0235116 A1 | 9/2008 | Jensen | |
| 2008/0250349 A1 | 10/2008 | Peiro et al. | |
| 2008/0288542 A1 | 11/2008 | Buttars | |
| 2008/0319910 A1 | 12/2008 | Duffus et al. | |
| 2009/0003712 A1 | 1/2009 | Mei et al. | |
| 2009/0132435 A1 | 5/2009 | Titus et al. | |
| 2009/0240629 A1 | 9/2009 | Xie et al. | |
| 2009/0327437 A1 | 12/2009 | Estrada | |
| 2010/0017725 A1 | 1/2010 | McCarthy et al. | |
| 2010/0223677 A1 | 9/2010 | Scapa | |
| 2010/0228679 A1 | 9/2010 | Scapa | |
| 2010/0251181 A1 | 9/2010 | Lal | |
| 2011/0239131 A1 | 9/2011 | Koren | |
| 2012/0022954 A1 | 1/2012 | Garcia et al. | |
| 2012/0066089 A1 | 3/2012 | Henderson | |
| 2012/0173975 A1 | 7/2012 | Herz et al. | |
| 2012/0226978 A1 | 9/2012 | Harberts et al. | |
| 2012/0246734 A1 | 9/2012 | Pride et al. | |
| 2013/0185656 A1 | 7/2013 | Heikes et al. | |

FOREIGN PATENT DOCUMENTS

| | | |
|---|---|---|
| EP | 2409258 A2 | 1/2012 |
| JP | 2002091595 | 3/2002 |
| JP | 2005250635 A | 9/2005 |
| JP | 2007265193 A | 10/2007 |
| JP | 20070286703 | 11/2007 |
| JP | 2414954 | 2/2012 |
| WO | WO9220021 | 11/1992 |
| WO | WO2010108006 A2 | 9/2010 |
| WO | WO2010115107 A2 | 10/2010 |

OTHER PUBLICATIONS

Brignall, "Peugeot launches car club with a difference", The Guardian, Jul. 9, 2010, retrieved from: http://www.guardian.co.uk/money/2010/jul/10/peugeot-car-club-mu/print on Oct. 4, 2011.

Levine, "Share My Ride", The New York Times, Mar. 8, 2009, retrieved from: http://www.nytimes.com/2009/03/08/magazine/08Zipcar-t.html?pagewanted=print on Oct. 4, 2011.

International Search Report and Written Opinion dated Nov. 2, 2010 from the corresponding International Patent Application No. PCT/US2010/029787 filed Apr. 2, 2010.

Zipcar, "is zipcar for me", retrieved from: http://www.zipcar.com/is-it/ on Oct. 4, 2011.

Zipcar, "rates & plans", retrieved from: http://www.zipcar.com/atlanta/check-rates on Oct. 4, 2011.

International Search Report and the Written Opinion of the International Searching Authority (ISA/KR) dated Dec. 27, 2012 from corresponding International Application No. PCT/US2011/055060 filed Oct. 6, 2011.

International Preliminary Report on Patentability dated Sep. 29, 2011 from the corresponding International Patent Application No. PCT/US2010/027820 filed Mar. 18, 2010.

International Search Report and Written Opinion dated Oct. 26, 2010 from the corresponding International Patent Application No. PCT/US2010/027820 filed Mar. 18, 2010.

Extended European Search Report in co-pending European Application No. 10754111.2 mailed on Aug. 14, 2012 in 5 pages.

International Preliminary Report on Patentability dated Oct. 13, 2011 from the corresponding International Patent Application No. PCT/US2010/029787 filed Apr. 2, 2010.

* cited by examiner

TOKEN BASED DIGITAL CONTENT LICENSING METHOD

CROSS-REFERENCE TO RELATED APPLICATIONS

This Application is a continuation-in-part of U.S. patent application Ser. No. 14/531,443, filed Nov. 3, 2014, which is a continuation of U.S. patent application Ser. No. 12/753,228, filed Apr. 2, 2010, which claims the benefit of U.S. Provisional Patent Application No. 61/166,036 filed Apr. 2, 2009, and is in turn a continuation-in-part of U.S. patent application Ser. No. 11/061,166, filed Feb. 21, 2005, now U.S. Pat. No. 8,073,780, issued Dec. 6, 2011, which is in turn a continuation-in-part of U.S. patent application Ser. No. 09/855,317, filed May 15, 2001, now of U.S. Pat. No. 7,672,972, issued Mar. 2, 2010, all of which are incorporated herein by reference in their entirety.

TECHNICAL FIELD

The present invention relates, in general, to methods and apparatus for licensing and managing the usage of digital content.

BACKGROUND OF THE DISCLOSURE

Although computer programs, individually also referred to as computer software products, video games, music, etc., can be sold to an end user, a more frequent approach is to license the digital product or program to an end user, with the software vendor or owner retaining ownership of all of the rights to the product.

Each license is devised to control the usage of the product or software by stating the conditions under which the product may be used, such as the location of use, the number of times used, etc. Digital products are licensed in many ways. By one category, licenses can be divided into node-locked licenses or network licenses. By another category, licenses can be divided into product licenses or product suite licenses. In general most licenses could be described by a combination or a simple variation thereof of the above two categories; i.e. node-locked product licenses, node-locked product suite licenses, network product licenses, and network product suite licenses.

Node-locked licenses restrict the use of software and digital products to a given computer. The major limitation of this approach is that it requires customers to purchase software separately for each potential user. Since each user does not use each software on his machine all the time, software purchased via this approach would idle most of the time. This is a very inefficient use of customers' money.

Network licenses allow access to the software products on computer networks formed of a number of interconnected computers or nodes which may be linked to each other and/or a central host. This addresses the primary inefficiency of node-locked licenses. Since the customer must purchase licenses only to cover the anticipated number of peak simultaneous users of that software.

Product licensing restricts the use of the license to only the product for which it is valid. In other words, the license is not transferable to other products. The limitation of this approach is that a customer must purchase the peak licenses, either node-locked or network, for each product separately. Again, peak usage for different products do not occur at the same time. Hence, the customer ends up purchasing more software licenses than really required.

Product suite licenses allow access to several software products using common licenses. A suite would generally include several individual programs which may be run concurrently with each other or individually and may or may not be linked to other programs in the suite. Traditional licensing approaches for computer programs or suites typically involve one license for all of the programs in each entire suite such that a user on a node of a computer network is charged with one license use regardless of which program the user is running from a particular program suite. A major limitation of this approach is that it assumes that each product in the suite has an equal value. Also, product suites typically involve a small number of software products which complement each other, and the expansion of suite licensing to license a wide range of software products is commercially impractical.

A recent development in licensing has been the units based licensing of multiple products. In such a system, different products are assigned different values in terms of units. A customer would license a certain number of units to run any and all of these products. While on paper, this system appears to address limitations listed above, in reality it does not due to the manner in which it is implemented by several organizations. Under this setup, when a user runs multiple products, the user is charged multiple units, also called stacking of units. Since the customers have limited budgets for purchasing software products, this system (i) forces the users to terminate one product in order to run another, thus decreasing the user's efficiency, or (ii) forces the customer to purchase additional licenses with no additional value thus undermining the profitability of their organization. This system does not encourage users to try new products, even though they are accessible and available on their network.

Other types of licensing techniques, such as a leveling license approach, enable new digital content to be used without incurring many or any additional licensed units. Either license approach can work for companies having multiple users tied together in a company based computer network.

Home computer users typically download many different types of digital content, including computer software, digital music, video games, movies, etc. While some homes can have multiple computers and multiple simultaneous users interconnected by a home based computer network, the number of users is relatively small, being on the order of two or three network connected nodes in each network at lower use or license fees.

Further, home computer users typically download the different forms of digital content from many different sources. These multiple sources make license management inoperable. In addition, the relatively small, individual users who download digital content from multiple sources are unable to take advantage of group discounts, parental monitoring and block-out, etc.

To provide a wider range of available digital content, it would be desirable to provide a club or group based approach whereby any number of individuals, either at businesses, home, etc., can form a group and act in the same manner as a company by operating under a license approach for the most economical use of a wide range of digital content made available in a selectable digital product suite.

SUMMARY OF THE DISCLOSURE

A method for token based club digital content licensing is disclosed.

In an embodiment, token based club digital content licensing may include weighted leveling license unit based digital content access control, which may include receiving, from a first user device, at a server, a first request for access to a first digital content object, wherein the first request indicates a first unique user identifier associated with a plurality of available license units, identifying a first assigned unit count for the first digital content object, and on a condition that the first assigned unit count is within a cardinality of the plurality of available license units, enabling access to the first digital content object by the first user device. Weighted leveling license unit based digital content access control may include receiving, from the first user device, at the server, a second request for access to a second digital content object, wherein the second request indicates the first unique user identifier, identifying a second assigned unit count for the second digital content object, identifying a weighted leveling licensing weight, on a condition that a product of the weighted leveling licensing weight and a sum of the first assigned unit count and the second assigned unit count is within the cardinality of the plurality of available license units, enabling access to the second digital content object by the first user device, and on a condition that the product of the weighted leveling licensing weight and the sum of the first assigned unit count and the second assigned unit count exceeds the cardinality of the plurality of available license units, preventing access to the second digital content object by the first user device.

In another embodiment, token based club digital content licensing may include weighted leveling license unit based digital content access control, which may include receiving a first request for access to a first content object, wherein the first request indicates a plurality of licensed units, identifying a first assigned unit count for the first content object, on a condition that a cardinality of a plurality of available licensed units from the plurality of licensed units is less than a cardinality of the plurality of licensed units, identifying one or more currently accessed content objects associated with a plurality of unavailable licensed units from the plurality of licensed units, identifying a weighted leveling licensing weight, determining whether to enable access to the first content object based on the weighted leveling licensing weight, the first assigned unit count, and a respective assigned unit count for each currently accessed content object from the one or more currently accessed content objects, in response to a determination to enable access to the first content object, enabling access to the first digital content object, and in response to a determination to prevent access to the first content object, preventing access to the first digital content object.

In another embodiment, token based club digital content licensing may include weighted leveling license unit based digital content access control, which may include receiving, from a first user device, at a server, a first request for access to a first digital content object, wherein the first request indicates a first unique user identifier associated with a plurality of available license units, identifying a first assigned unit count for the first digital content object, and on a condition that the first assigned unit count is within a cardinality of the plurality of available license units, enabling access to the first digital content object by the first user device. Weighted leveling license unit based digital content access control may include receiving, from the first user device, at the server, a second request for access to a second digital content object, wherein the second request indicates the first unique user identifier, identifying a second assigned unit count for the second digital content object, identifying a weighted leveling licensing weight, on a condition that a sum of a product of the weighted leveling licensing weight and the first assigned unit count and a product of the weighted leveling licensing weight and the second assigned unit count is within the cardinality of the plurality of available license units, determining to enable access, and on a condition that the sum of the product of the weighted leveling licensing weight and the first assigned unit count and the product of the weighted leveling licensing weight and the second assigned unit count exceeds the cardinality of the plurality of licensed units, determining to prevent access.

BRIEF DESCRIPTION OF THE DRAWINGS

The various features, advantages and other uses of the present invention will become more apparent by referring to the following detailed description and drawing in which.

DETAILED DESCRIPTION

Figure 1:
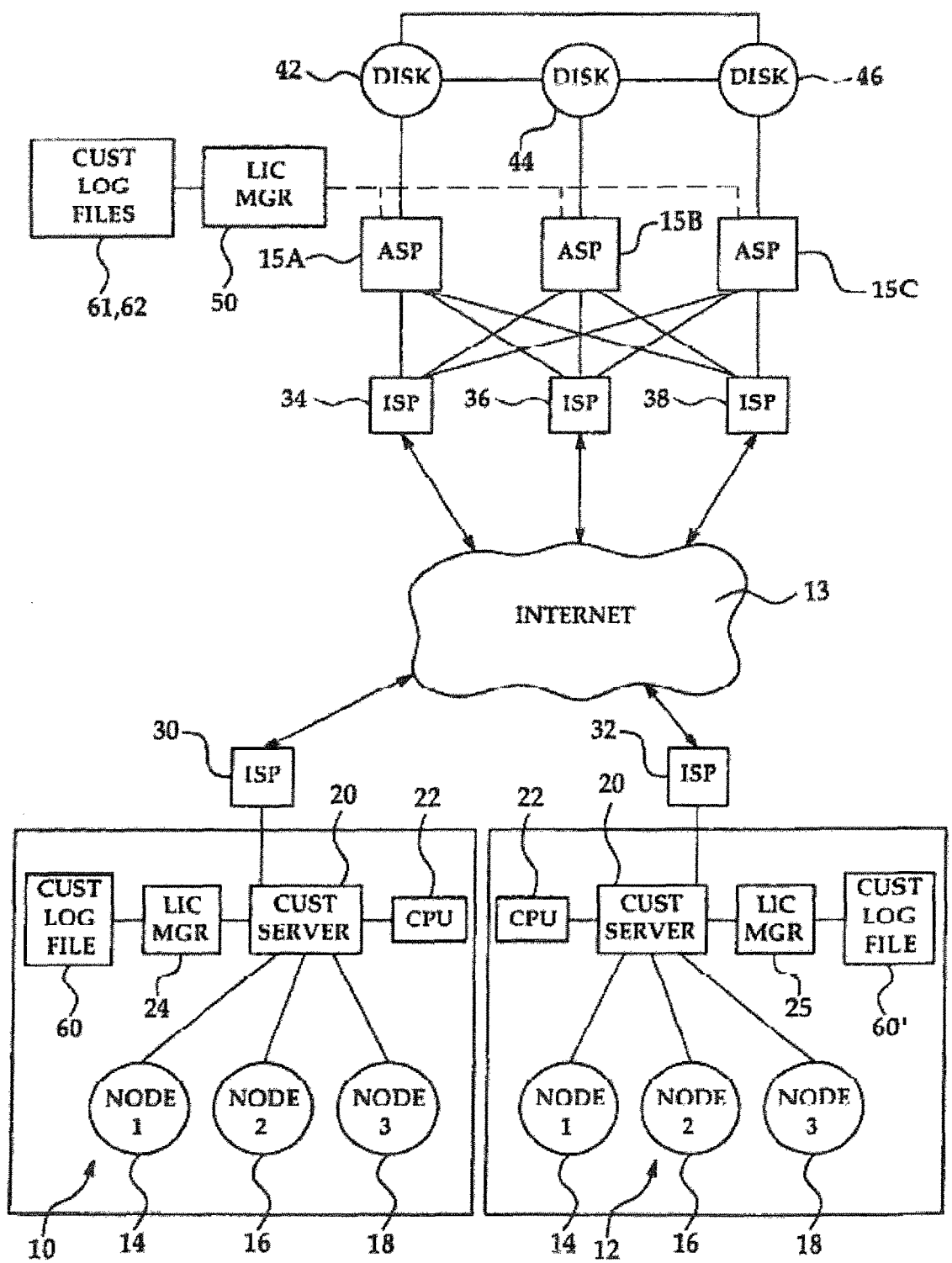
FIG. 1 is a pictorial representation of a communication network coupled to a computer server and application service provider which can use a token based club digital content licensing management method.

Referring now to the drawings and to FIG. 1 in particular, there is depicted a computer network containing at least one customer computer 10 and, preferably, a plurality of customer computers 10, 12, etc. which can independently communicate through a communications network 13, such as the Internet, with one or more remotely located networks, which may include one or more units, such as application service providers (ASPs) 15A, 15B, 15C, license manager 50, one or more customer log files 61, 62, or a combination thereof.

By way of example only, the customer computer networks 10 and 12 each include at least one and, optionally a plurality of individual nodes, with three nodes 14, 16, and 18, being depicted by way of example only in networks 10 or 12. Each of the nodes 14, 16, and 18 is connected to a network server 20 and has its own network address so that any one of the nodes 14, 16 and 18 can communicate with the each other nodes 14, 16, and 18 within the network 10 or 12. The network server 20 is connected in data communication with a host CPU 22.

Although the individual nodes 14, 16, and 18 are depicted as being connected in a spoke configuration to the network server 20, it will be understood that this arrangement is by example only as the individual nodes 14, 16, and 18 may be connected in a ring configuration or any other configuration found in computer networks. Further, the network server 20 and the host CPU 22 may be combined into a single computer.

As will be clearly understood by those in the computer art, each of the nodes 14, 16, and 18, as well as the network server 20 and the host CPU 22, may be formed of a processing unit, hereafter CPU, such as a microprocessor, as well as input and output components coupled to the processing unit, including a memory, input components, such as a key inputs, mouse, etc., and output components, such as a screen display, printer, etc., not shown.

The processing unit and coupled I/O components may be implemented in any electronic device, such as a desktop or laptop computer, a handheld or portable computer-like device, MP3 and other electronic media players, cellular telephones, etc.

For explanatory purposes only, a node is defined as a unique combination of a user, or a CPU or host, or a display, or a user and a CPU, or a CPU and a display, or a user and a display, or a user, a CPU and a display.

A license manager 24 is embodied in a software program which may be resident or stored in the memory of the network server 20 or the host CPU 22 and/or capable of being stored in a storage media, such as a disk, CD-ROM, etc. The license manager 24 may also be resident or stored in the memory of a separate central processing unit or microprocessor which is coupled to the network server 20 or the host CPU 22.

The function of the license manager 24, as described in greater detail hereafter, is to control access to as well as monitor the execution or running of one or more pieces of individual digital content or media coupled together or sold as a suite or even sold or licensed individually. The suite is formed of a plurality of individual digital content which may be separately executable or executable in multiple numbers, and is resident in the memory and/or a hard drive connected to the host CPU 22. In this arrangement, the network server 20 merely distributes an authorized licensed program from the suite to the requesting node.

Before defining the details of an example of a licensing method which may be employed, definitions of key terms will first be presented.

Licensed Units: The total number of units licensed by a customer on a customer computer network.

Customer Computer Network (CCN) Assigned Units: The value in terms of units assigned to each discrete digital content in the product suite licensed by one customer for execution on the customer computer network.

Customer Computer Network (CCN) Node Running Total: The total number of units checked out by one node on the customer computer network at a given time. In a leveling licensing arrangement on the customer computer network, the CCN node running total is equal to the product or digital content having the highest CCN assigned units value of all of the products or digital content executed by the one CCN node at one given time. In a stacking licensing arrangement, the CCN node running total is equal to the total of the CCN assigned units of all of the products or digital content executed by the one CCN node on the customer computer network.

Customer Computer Network (CCN) Checked Out Units: The sum of node running totals of all nodes on the customer computer network.

Total Checked Out Units: The sum of the CCN checked out units.

Available Units: Licensed units minus total checked out units.

Customer Computer Network (CCN) Required Units: Number of units required to start a new product or digital content run by one node on one customer computer network. In a leveling licensing arrangement, if the CCN assigned units for the new product or digital content are greater than the CCN node running total, the CCN required units equals the CCN assigned units of the new product minus the CCN node running total. If the CCN assigned units for the new product or digital content are less than or equal to the CCN node running total, then the CCN required units equals zero. In a stacking licensing arrangement, the CCN required units equals the number of CCN assigned units for the new product or digital content.

Customer Computer Network (CCN) Returned Units: Number of units returned to the available units when a product or digital content is terminated by one node on the customer computer network. In a leveling licensing arrangement, if the CCN assigned units of the terminated product or digital content are less than the CCN node running total, then the CCN returned units equals zero. If the CCN assigned units for the terminated product are equal to the CCN node running total, then the CCN returned units equals the CCN assigned units for the terminated product minus the next highest CCN assigned units value of the remaining products or digital content running on the node. In a stacking licensing arrangement, the CCN returned units equals the CCN assigned units of the content terminated on the customer computer network.

Each piece of digital content in a program suite licensed to a particular customer computer network, such as customer computer networks 10 and 12, is provided with two separate assigned units, such as the CCN assigned units defined above. The actual number of assigned units assigned to each discrete digital content in the program suite can be arbitrarily chosen, and the number of assigned units for two or more pieces of digital content can be identical or different.

By way of example only, the number of assigned units assigned to each piece of digital content is selected as a function of one license price of each product or program divided by an arbitrary factor. By example only, the lease price of each discrete digital content or digital product is divided by $250 to yield the number of assigned units assigned to each piece of digital content. It will also be understood that the number of assigned units assigned to each digital content may also be based on the size of the individual products, the amount of time typically employed to run each digital content, or its inherent value to an end user in a particular application.

The above described assigning of units for each piece of digital content in the program suite can be further understood by referring to U.S. patent application Ser. No. 09/553,115 filed Apr. 13, 2000, and entitled PRODUCT SUITE LICENSING METHOD, the entire contents of which are incorporated herein by reference. This prior application describes a licensing method based on a unique leveling concept for controlling the licensing of products for digital content in a product suite in a single computer network.

Thus, the licensing method requires input from the license manager 24 of the customer computer network 10 to determine the customer computer network checked out units of digital content currently being executed by the customer on the customer computer network 10 for the customer computer network 10.

Each customer computer network 10 or 12 communicates with the data communication network 13 through an Internet service provider or ISP 30, 32, respectively. In addition, the data communication network or Internet 13 in the present invention communicates with one or more ASPs through Internet service providers 34, 36 and 38, respectively. Although a single ISP 34 may be employed for communicating with one or more customer computer networks 10 and 12, for further flexibility and to insure a faster response time and an execution or run of individual digital content on the application service provider for any of the customer computer networks 10 or 12, the plurality of ISPs 34, 36 and 38 are each connectable to memory storage media, such as one or more disks 42, 44 and 46. Each can access each of the disks, 42, 44 and 46 to obtain data or digital content stored on the disks 42, 44, and 46.

Initially, the customer computer network license manager 24 recognizes the total number of licensed units purchased or made available in the customer server 20. This total number of licensed units can be paid in any of a number of ways, each primarily based on a license term or period, such as one year, for example only. The license royalty or fee will be based on a certain price per license unit, such as $250 per license unit in the above example. However, the number of licensed units purchased by this license fee covers the complete license term, such as one year, for example, and acts as a cap limiting the number of individual programs or products, as described hereafter, which can be executed or run simultaneously on the customer computer network 10. To state this another way, the total checked out units at a given time cannot exceed the number of licensed units paid for by the licensee or entity controlling the network 10.

The licensed units which are purchased by a particular customer can come in a number of different forms. In one form, all of the licensed units are treated the same and useable both on the customer computer network 10 or 12.

A customer log file 60 is maintained by the license manager 24 for the customer computer network 10 and a customer log file 60' by the license manager 25 for the customer computer network 12. The customer log file 60 or 60' contains the total number of available units which can be used at the customer computer network 10 or 12 at any given time. The license manager 24 for the customer computer network 10 will update the customer log file 60 for each change of the available units on the customer computer network 10. As described hereafter, such a change in the available units on the customer computer network 10 results from the execution of additional products from the program suite or the termination of the execution of one of the products in the suite either on the customer computer network 10 or 12.

A customer may execute any of the digital content on its local customer computer network 10 or 12 based on the determination by the license manager 24 or 25, respectively, whether the number of available units is sufficient to execute the next requested digital content on the respective customer computer network 10 or 12.

However, if a sufficient number of units is available for executing the requested digital content, the license manager 24 sets a flag "units=available" in step 76 and then makes a determination in step 78 whether the user has asked to lock or not lock the units at this time. If the user has asked not to lock the units at this time, the flag remains set at "units=available", and the status is logged in step 82 for further processing. However, if the user has asked to lock the units, the license manager in step 80 sets a flag "units=locked", and the status is logged in step 82 for further processing and asks the license manager 24 to check out the units.

The license manager in step 84 communicates the unit status logged in step 82 at regular intervals, such as every 1 minute or 15 minutes, for example, or when the status is updated in steps 72, 76 or 80 and logged in step 82.

If the status is "units=locked", the requested content will run as soon as a CPU becomes available on the ASP network. However, regardless if the status is "units=available" or "units=unavailable", the status may change depending on the activities on the customer computer network 10, 12. Hence, in addition to logging the status on to step 82, steps 72 and 78 also loop the control back to step 74 so that step 70 will be re-evaluated and the units status may be changed from "available" to "unavailable" or vice versa depending upon the change in availability of units in step 76, or a change in CPU status from available to unavailable, or a second or later queued content may be executed instead of the first queued request.

Figure 2:
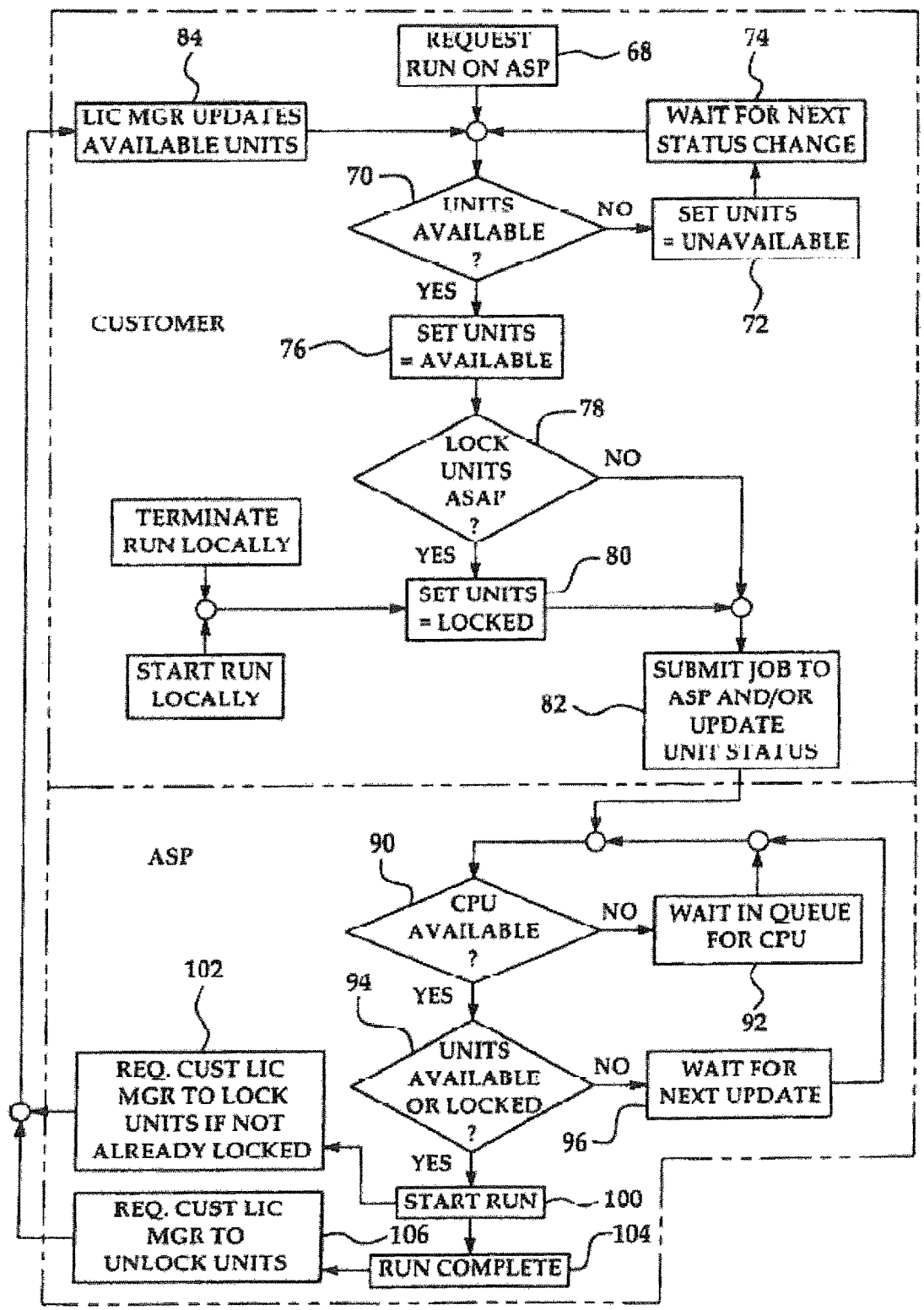
FIG. 2 is a flow diagram depicting the operation of the license management method.

As shown in FIG. 2, the license manager 24 updates the available units in the customer log file 60 upon any of the following events: Termination of a local run on the customer computer network 10; the setting of "units=locked" flag in step 80; the start of an execution or run of a piece of digital content on the customer computer network 10.

Thus, it can be seen that the number of available units in the customer log file 60 can be a dynamically changing number dependent upon execution of digital content on the customer computer network 10. The execution, locking or unlocking of units and the termination of execution of any piece of digital content on the customer computer network 10 causes the number of available units to increase or decrease accordingly.

If a CPU is available as determined in step 90, the license manager 50 makes a determination in step 94 if the units status is "locked", "available" or "unavailable". If the status is "unavailable", step 96 is executed wherein the license manager 50 waits for the next unit status update in steps 82 and 84 from the customer computer network 10 or the license manager 50 regarding the status of CPUs.

The license manager 50 controls and monitors all jobs queued, whether due to unavailability of a CPU or due to the unavailability of units, as follows. As and when a CPU becomes available due to termination of a job in step 104, the license manager 50 would check the first job in the queue for its units status in step 94. If units are "available" or "locked", that job will be executed as described earlier. If units were "unavailable", the job will be returned back to the queue and marked as "returned". The license manager will now check the next job in the queue for its units status. It will continue to check jobs in the queue until it finds a job with units status of "locked" or "available", or there are no more jobs left to check in the queue. The license manager 50 may also be designed such that a "returned" job would retain its original position, or it is sent to the bottom of the queue, or it is demoted by a certain number of spots in the queue. Also, if a job is flagged "returned" a certain number of times, say 3 times for example, and is waiting in the queue for a certain number of hours, say 6 hours for example, the license manager may be designed to delete the job from the queue altogether.

Figure 3:
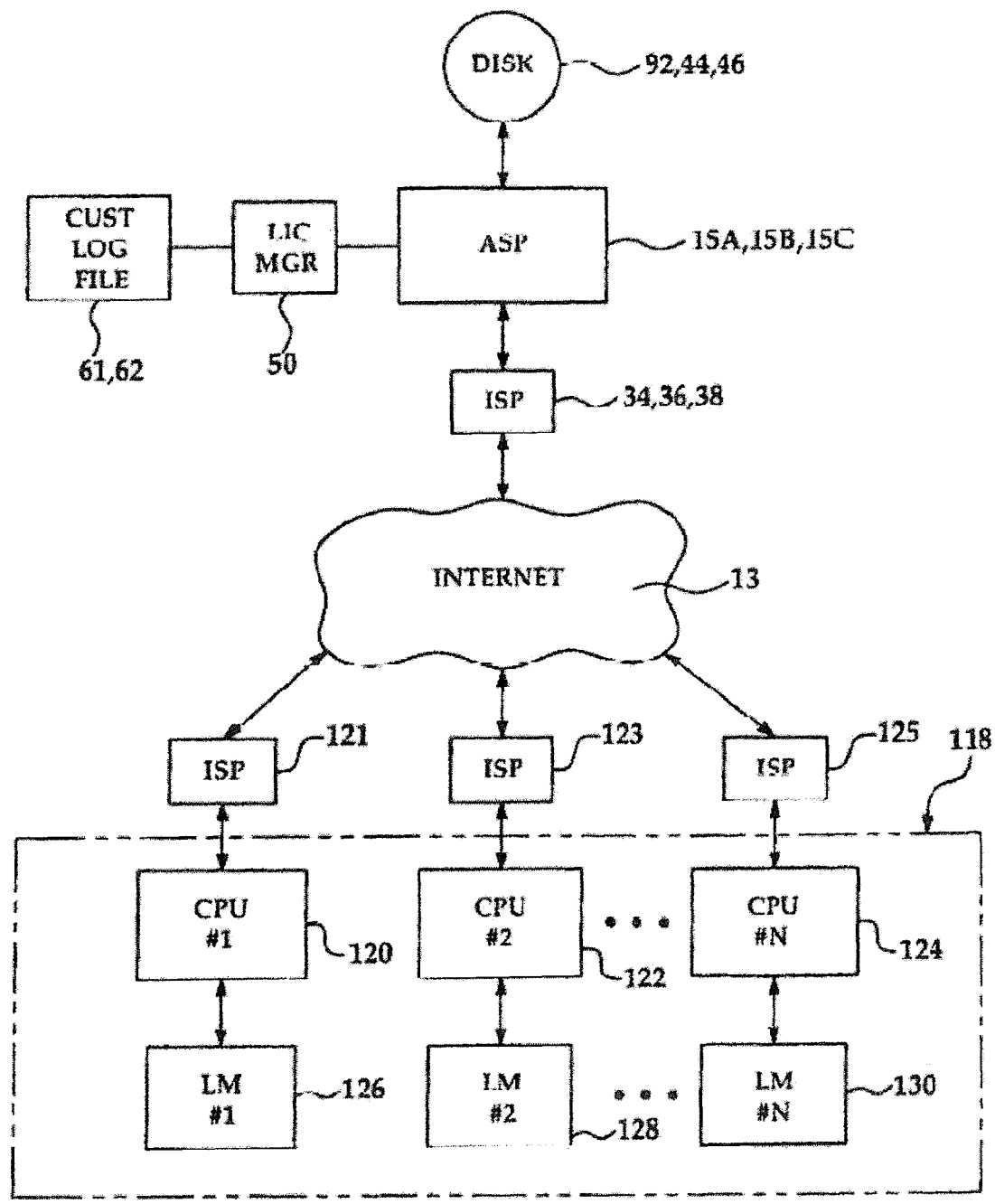
FIG. 3 is a pictorial representation of an alternate computer server and application service provider communication network using the licensing management method.

Referring now to FIG. 3, there is depicted a similar arrangement of a customer computer network denoted here by reference number 118 which communicates through a global telecommunication network, such as the Internet 13, in the same manner as described above and shown in FIGS. 1 and 2.

However, in this arrangement, the single customer computer network 118 is formed of a number of individual CPUs 120, 122 and 124, for example only. Each CPU 120, 122 and 124 has its own individual license manager 126, 128 and 130, respectively. Each CPU 120, 122 and 124 also has access through the Internet 13 via individual Internet service providers or ISPs 121, 123 and 125, respectively.

The individual CPUs 120, 122 and 124 may constitute three different users not normally affiliated with a business customer computer network. These users act independently and may be in different physical locations without any direct connection between the CPUs 120, 122 and 124. The users of the CPUs 120, 122 and 124 will initially join together as a group forming the customer computer network 118 by purchasing a total number of licensed units as a group. The individual license managers 126, 128 and 130 have access to each other via the Internet 13 to maintain a total number of individual checked out units and available units for each CPU 120, 122 and 124.

The arrangement shown in FIG. 3 enables a number of what would normally be independent CPUs to have access to an application service provider to run the latest digital content of any type, such as application programs, video games, etc., without purchasing the actual software or video game. Each individual customer is restricted by acting as a group in terms of abiding by the number of available units before being able to access and execute digital content; but typically obtains access to a larger number of units than purchased individually by the customer, and consequently to larger quantities of digital content than each customer's individually purchased units would allow.

There is further disclosed a unique token based, club licensing method for digital content.

The term "digital content" will be understood to mean any and all forms of digital content, commonly known as computer software programs, video games, music, movies, videos, etc., which can be accessed, downloaded, input, or otherwise transferred to a computer or processor and run or executed.

Thus, "digital content" includes computer software in the form of application programs, operating systems, etc., as well as digital content for audio, video, audio/video executable files. Further, the term "digital content" as used with the present licensing method further includes digital data or digital files which can be processed by other application programs or require execution by other software and/or hardware, such as a music player, etc.

The present licensing method makes use of a customer group or club. "Club" will be understood to mean any group of one or more individuals which join together to act as a single entity. The club can be a family or groups of families, for example, as well as a classroom of students, a small business, or a group of people who have met through the Internet or elsewhere and desire to be associated and act as a group for accessing digital content.

Figure 4:
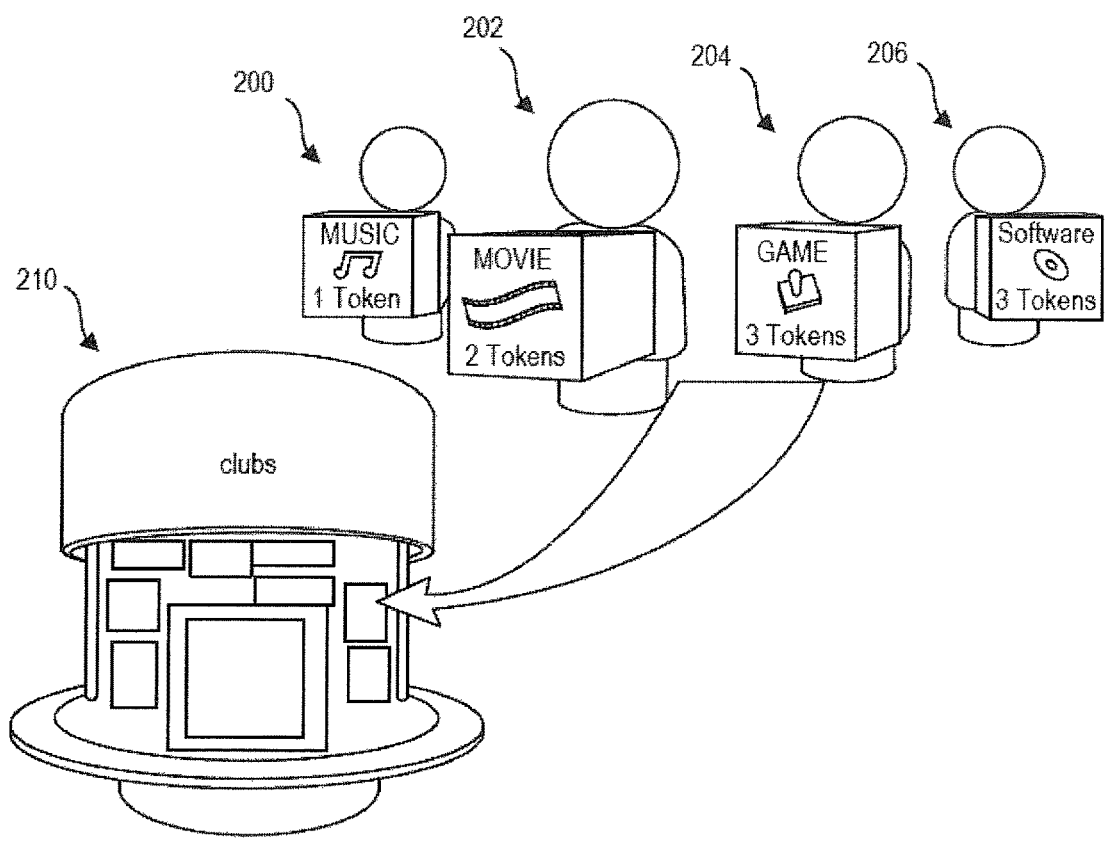
FIGS. 4-7 are pictorial representations of a token based club digital content licensing arrangement.
Figure 5:
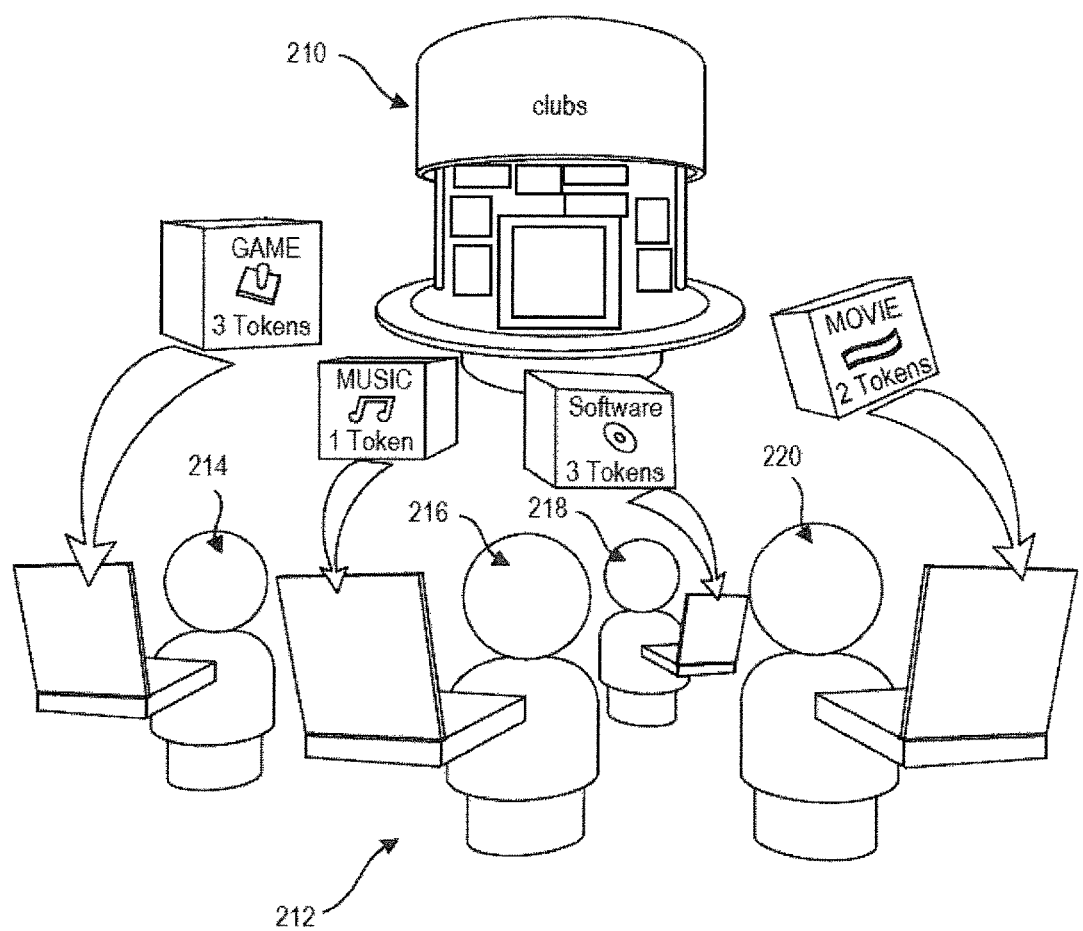

The digital content which is accessible by each group can be made available in a number of different ways. As shown in FIG. 4, one or more entities 200, 202, 204, 206, etc., such as a software company, music company, movie company, etc., may offer a list of accessible or downloadable digital content.

Alternately, an entity can accumulate a product or digital content suite of downloadable digital content, including some or all of computer software programs, movies, videos, video games, music, etc., and make them available as a source 210 to each group.

Either product or digital content suite approach requires the formation of a club 212 under club defined rules. Financial arrangements are made for billing the individual club members 214, 216, 218, 220, etc., based on any charge approach, including fees based on the amount of usage of the product suite, pro rata cost per club member 214, 216, etc.

Each club 212 will register with the product suite source, but the individual club members 214, 216, etc., do not have to be directly interconnected on the same network. Rather, each club member 214, 216, etc., may access the product suite source 210 independently of other club members. Each club member 214, etc., however, will be recognized by the product suit source 210 as belonging to a particular club 212 and the digital content pre-approved for selection by the particular club 212 will then be made available for selection by each club member 214, 216, etc.

The digital content or product suite license can be charged to the club members of each club 212 according to any licensing technique, including a stacked licensing technique wherein the number of assigned licensed units or tokens 220 are associated with each particular digital content, which can be set by the owner or originator of the digital content, are added, when the digital content is downloaded or executed by a club member, to the checked out tokens or units associated with other digital content which is being simultaneously run or executed by other of the club members 212. Each club 212 can have a maximum number of tokens 220 or total group licensed units made available to it based on the total license fees paid by each club 212. In this manner, when there are insufficient available license units or tokens 220 remaining for a club member 214, 216, etc., to access and download a particular piece of digital content, i.e., the number of available license units is less than the assigned license units for the digital content the user wishes to download that club member will not be able to access and execute the digital content until additional licensed units become available by the termination or return of an executed piece of digital content by another club member to the club product suite.

Each club member can also optionally be provided with private tokens which the club member purchases. Private tokens enable a particular club member to access digital content from the product suite on his own without regard to the available licensed units under the licensing technique employed by the club 212. If there are an insufficient number of private tokens remaining when private tokens have been employed for other currently executed or downloaded digital content, additional digital content cannot be downloaded until sufficient numbers of licensed private tokens have been returned to the product suite by the user.

The products and content that each club member 214, 216, etc., can access can be selected and preset by each club 212. For instance, parents may set up a club for their children and preselect software or other digital content that is appropriate for their children. The children are then free to make selections from within the pre-screened of digital content in the product suite. In general, a club 212 will be able to access all of the digital content in the product suite unless it places its own restrictions on its members.

The club approach enables individual club members to increase their buying power. For clubs having larger numbers of members, it is more unlikely that each club member will attempt to use club tokens 220 simultaneously. Thus, a club 212 formed of fifteen people may need to only buy enough tokens 220 for ten members to run products simultaneously.

A club 212 that frequently reaches its token limit can purchase more tokens 220. Club members thus enjoy the benefit of being able to access a large number of digital products for a single subscription fee. The digital products are maintained current by the digital content source or the product originator thereby making it unnecessary for club members to purchase a product or upgrade existing products which they have purchased.

Each club 212 can establish its own rules. The following example of the operation of a club will be understood to be by example only.

First, each club 212 picks a club name and a unique password. Each member of the club 212 then provides a login ID and personal password. A club president can be selected.

For convenience, several prepackaged club types can be made available. Choosing a club type sets up the initial operating rules and services that the club members receive. However, the preset rules and services can be customized Examples of prepackaged club types can include a general club 212 accessing any type of digital content, a family club, a classroom club, a gamers club, music and video club, etc.

An optional club page can be provided through the digital content source to provide a menu of digital content available to the club, a convenient location for advertising and club messages, etc.

The club 212 will also set rules for adding new members, such as by invitation only, open enrollment, etc. Club voting rights can also be established by majority vote, unanimous vote, dictatorship, etc.

Each club 212 will decide the monthly fees to be paid by the club 212 from a schedule of fees established by the digital content source. Each club 212 can vote on the addition or removal of club members 214, 216, etc., the types of digital content made available to club members, mergers with other clubs, etc.

With respect to financial arrangements, each club member's credit card is billed automatically on a monthly basis for each club member's pro rata share of the monthly fee paid by the club 212. Other fee arrangements based on usage are also possible. Each club member can quit at any time or merely go "inactive" by not paying dues. Perks and incentives may also be provided by each club on an individual club basis from the digital content source. For example, bonus token giveaways can be provided by each club or each digital content source to keep club members enrolled. Bonus tokens may be provided for clubs that reach certain member sizes. Bonus tokens can also be provided to club members based on token usage over time, usage through related services, such as telephone calls, airlines, shopping, etc.

The digital content source can also provide early beta software for club members and exclusive movie, game or video releases for club members.

Figure 6:
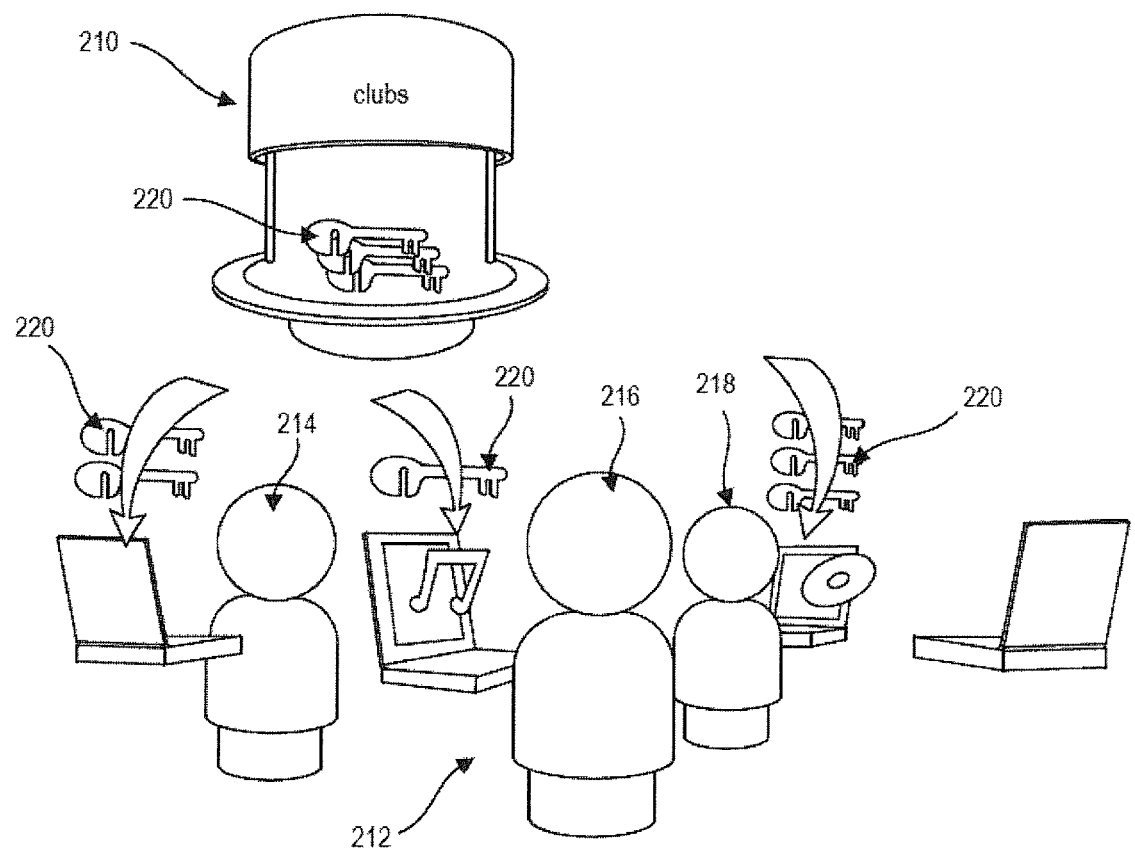

As shown in FIG. 6, a club 212 has purchased ten tokens from the source 210. The individual members 214, 216, etc., of the club 212 are then able to download and execute or run selected digital content from the digital content suite authorized by the club 212 from the source 210. For example, club member 214 is executing digital content which requires two tokens 220. Club member 216, meanwhile, is executing digital content requiring only a single token 220. Club member 218 is executing digital content which requires three tokens 220. This leaves four tokens 220 for other use by the same or other club members 214, 216, etc. Such digital content can be accessed and executed only if it requires four or less tokens 220. If the digital content or multiple pieces of digital content total more than four tokens 220, subsequent club members which access the product suite source 210 must wait until sufficient tokens 220 have been returned.

Figure 7:
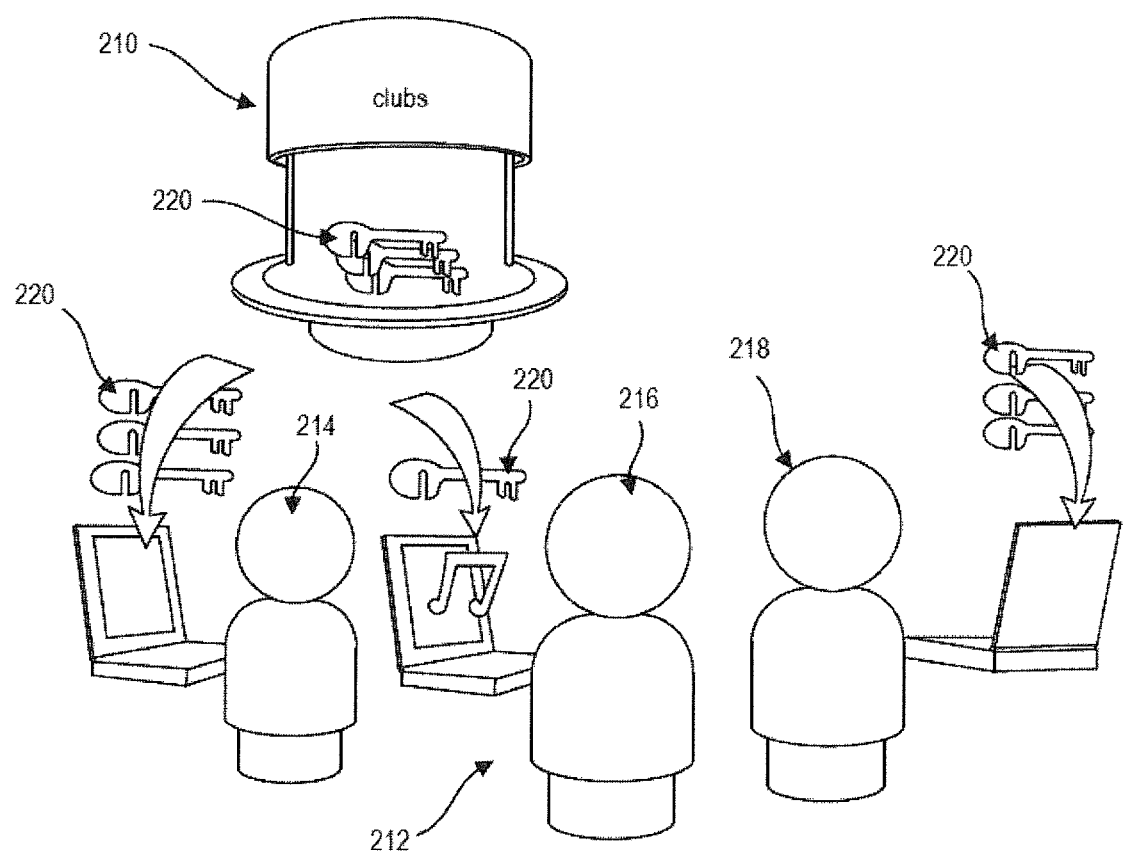

FIG. 7 shows another example in which club member 220 is executing digital content requiring three tokens 220. Club member 216 is executing digital content requiring only a single token 220. Club member 218 is executing digital content requiring three tokens. This leaves three tokens 220 in the club running total for selection by any of the members of club 212.

In some embodiments, a combination of leveling licensing and stacking licensing, such as weighted leveling licensing, may be used. For example, the CCN node running total may be identified using weighted leveling licensing. Weighted leveling licensing may include identifying a number, or cardinality, of assigned units for concurrently accessing content objects as a weighted average of the cardinality of assigned units for each of the concurrently accessed content object.

In some embodiments, a weight may be identified for weighted leveling licensing. For example, a first content object may have a cardinality of assigned units of five, a second concurrently accessed content object may have a cardinality of assigned units of ten, a weighted leveling licensing weight, such as eighty percent, may be identified, and the cardinality of assigned units may be identified based on the cardinality of assigned units for the first content object, the cardinality of assigned units for the second content object, and the weight, as 12 (0.8(5+10)=12).

In some embodiments, a weight may be identified for each concurrently accessed content object. For example, a first content object may have a cardinality of assigned units of five and a weight of eighty percent, a second concurrently accessed content object may have a cardinality of assigned units of ten and a weight of eighty percent, and the cardinality of assigned units may be identified as a sum of the weighted cardinality for the first content object and the weighted cardinality for the second content object, as 12 (0.8(5)+0.8(10)=12).

In summary, there has been disclosed a unique method for execution of digital content from a product suite containing licensed digital content, by preformed groups of users.

What is claimed is:

1. A method comprising:
receiving, from a first user device, at a server, a first request for access to a first digital content object, wherein the first request indicates a first unique user identifier associated with a plurality of available license units;
identifying a first assigned unit count for the first digital content object;
on a condition that the first assigned unit count is within a cardinality of the plurality of available license units, enabling access to the first digital content object by the first user device,
receiving, from the first user device, at the server, a second request for access to a second digital content object, wherein the second digital content object is different from the first digital content object, and wherein the second request indicates the first unique user identifier; and
performing weighted leveling license unit based digital content access control in response to receiving the second request, wherein weighted leveling license unit based digital content access control includes:
identifying a second assigned unit count for the second digital content object;
identifying a weighted leveling licensing weight;
on a condition that a product of the weighted leveling licensing weight and a sum of the first assigned unit count and the second assigned unit count is within the cardinality of the plurality of available license units, enabling access to the second digital content object by the first user device; and
on a condition that the product of the weighted leveling licensing weight and the sum of the first assigned unit count and the second assigned unit count exceeds the cardinality of the plurality of available license units, preventing access to the second digital content object by the first user device, wherein an assigned unit count is variable and is based on the corresponding digital content object.

2. The method of claim 1, wherein the second digital content object is from a plurality of digital content objects, wherein each digital content object from the plurality of digital content objects is associated with a respective assigned unit count.

3. The method of claim 2, further comprising:
associating the plurality of available license units with the first unique user identifier independently of the plurality of digital content objects.

4. The method of claim 1, wherein enabling access to the second digital content object by the first user device includes transmitting a signal to the first user device, the signal enabling access to the second digital content object by the first user device.

5. The method of claim 1, wherein preventing access to the second digital content object by the first user device includes transmitting a message to the first user device, the message indicating that access to the second digital content object is denied.

6. The method of claim 1, wherein enabling access to the second digital content object by the first user device includes enabling access such that access to the first digital content object by the first user device is enabled concurrently with access to the second digital content object by the first user device.

7. A method comprising:
receiving, from a first user device, at a server, a first request for access to a first digital content object, wherein the first request indicates a first unique user identifier associated with a plurality of available license units;
identifying a first assigned unit count for the first digital content object;
on a condition that the first assigned unit count is within a cardinality of the plurality of available license units, enabling access to the first digital content object by the first user device,
receiving, from the first user device, at the server, a second request for access to a second digital content object, wherein the second digital content object is different from the first digital content object, and wherein the second request indicates the first unique user identifier; and
performing weighted leveling license unit based digital content access control in response to receiving the second request, wherein weighted leveling license unit based digital content access control includes:
identifying a second assigned unit count for the second digital content object;
identifying a weighted leveling licensing weight;
on a condition that a sum of a product of the weighted leveling licensing weight and the first assigned unit count and a product of the weighted leveling licensing weight and the second assigned unit count is within the cardinality of the plurality of available license units, determining to enable access; and
on a condition that the sum of the product of the weighted leveling licensing weight and the first assigned unit count and the product of the weighted leveling licensing weight and the second assigned unit count exceeds the cardinality of the plurality of licensed units, determining to prevent access, wherein an assigned unit count is variable and is based on the corresponding digital content object.

8. The method of claim 7, further comprising:
associating the plurality of available license units with the first unique user identifier independently of the plurality of digital content objects.

9. The method of claim 7, wherein enabling access to the second digital content object by the first user device includes transmitting a signal to the first user device, the signal enabling access to the second digital content object by the first user device.

10. The method of claim 7, wherein preventing access to the second digital content object by the first user device includes transmitting a message to the first user device, the message indicating that access to the second digital content object is denied.

* * * * *

UNITED STATES PATENT AND TRADEMARK OFFICE
CERTIFICATE OF CORRECTION

Page 1 of 1

PATENT NO. : 9,633,182 B2
APPLICATION NO. : 14/862208
DATED : April 25, 2017
INVENTOR(S) : James R. Scapa It is certified that error appears in the above-identified patent and that said Letters Patent is hereby corrected as shown below:

On the Title Page

Item (63) Related U.S. Application Data:
After "Nov. 3, 2014, which is a", replace "continuation-in-part" with -- continuation -- therefor.

Signed and Sealed this
Fourteenth Day of April, 2020

Andrei Iancu
*Director of the United States Patent and Trademark Office*